July 4, 1944.  A. SOWDEN  2,352,663
PACKING MACHINE FOR CONTAINERS AND THE LIKE
Filed Feb. 7, 1941  3 Sheets-Sheet 1

Inventor:
Alfred Sowden
by Thos. A. Banning
Atty.

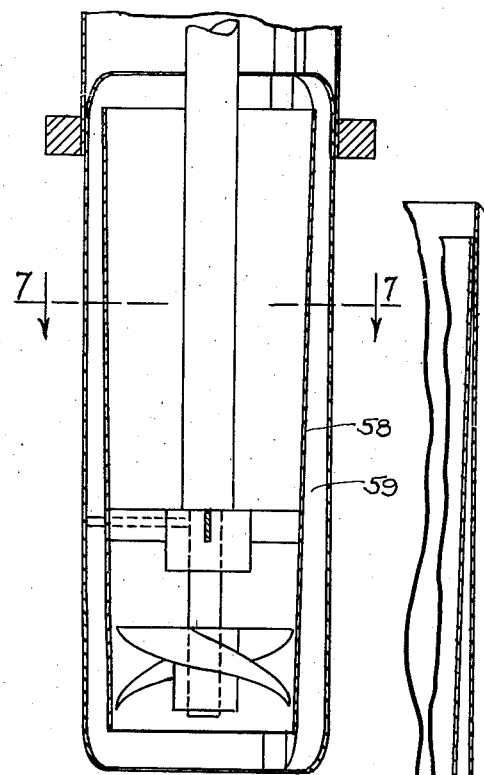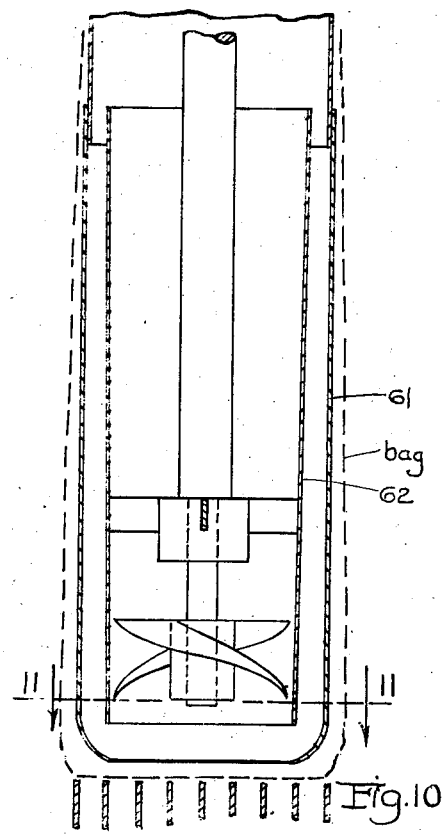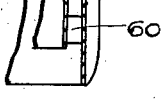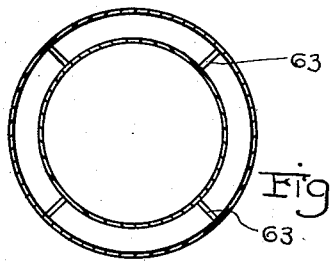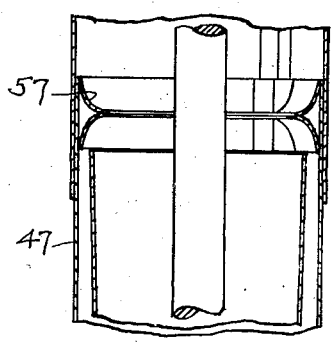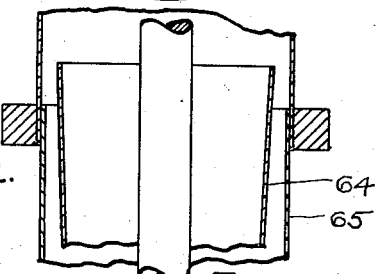

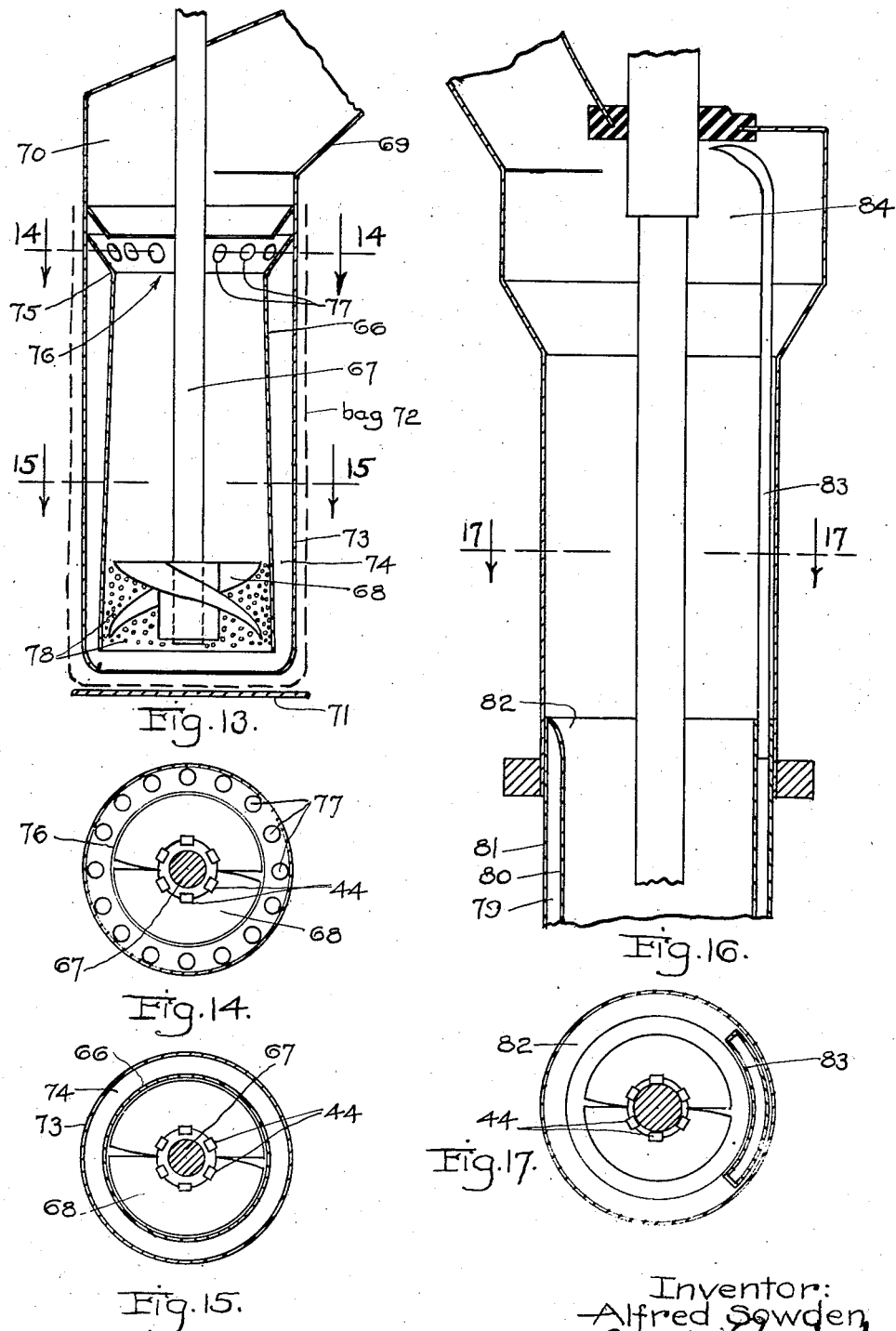

Patented July 4, 1944

2,352,663

UNITED STATES PATENT OFFICE 2,352,663

PACKING MACHINE FOR CONTAINERS AND THE LIKE

Alfred Sowden, Arkansas City, Kans.

Application February 7, 1941, Serial No. 377,804

3 Claims. (Cl. 226—23)

This invention concerns itself with improvements in packing machines for containers, and the like, especially machines for filling and packing bags and other containers with flour, feed, bran, shorts, and other similar materials. Other uses and applications of the features of the invention will suggest themselves to the student of this invention; but inasmuch as I have devised the features hereof with particular reference to such operations as mentioned above I shall illustrate and describe embodiments of the invention especially intended for such operations and use; but in so doing I wish it understood that I do not intend thereby to limit myself, except as I may do so in the claims to follow.

The main object of the present invention is to facilitate and improve the de-aeration of the materials undergoing the filling and packing operation. These machines are so constructed that the material is introduced into the bag or container by means of a filling tube, being dumped or otherwise rapidly introduced into such tube. There is provided a vertically or at any rate upwardly extending rapidly rotating shaft having on its lower portion one or more augers of such form that the rotation of the shaft and auger or augers while the material is being introduced into the container, produces a screwing action, the auger or augers (in some forms) screwing themselves upwardly through the material, and packing the material firmly into the bag during the operation. For this purpose the shaft and auger or augers may be so journalled that these parts may rise during the filling and packing operation, and while rotating, such rising (when used) being caused by the screwing action of the auger or augers on the material being acted on, and the amount of compression being largely determined by the weight of the parts so supported. When the operation is completed suitable means may be provided for either supporting the shaft and auger or augers in their raised position, or for releasing the filled and packed container, or both, and for instituting a new operation.

Now the introduction of the loose material into the upper end of the container presents the condition that said material is in greatly air-entrained condition, that is, it is fluffy and uncompacted, so that in order to ensure its maximum compacting during the filling and packing operation provision must be made for release of the contained or entrained air, thereby permitting the particles of material to be brought into close contact with each other. If a body of such loose or non-de-aerated material is forced into compacted condition the entrained air thereof will be compressed, but since such air is still entrained in the material, as soon as the compressing force is released the material will again expand, forcing itself upwards in the body of the container, with increase of the bulk of the material, decrease of its compactness, and other serious objections. On the other hand, if the entrained air be released during the filling and packing operations, so that a substantially solid body of the material itself is produced, it is not only possible to pack said material much more densely than before, but also when the packing or compressing force is released the so packed material will retain its compressed and dense condition, its expansion will be relatively small compared to the expansion which would otherwise occur, its bulk will remain in the desired small condition, the so-filled and packed bags will not overflow when the compression is released, and many other benefits will be secured.

Referring again to the general types of machines for filling and packing the containers, heretofore mentioned, certain constructions thereof are shown and described in various of my heretofore filed applications for Letters Patent of the United States. Included in this category are Letters Patent No. 2,184,474, filed March 31, 1938; Serial No. 273,973, filed May 16, 1939, being Letters Patent No. 2,258,631, issued October 14, 1941; Serial No. 288,736, filed August 7, 1939, being Letters Patent No. 2,216,786 issued October 8, 1940; and Serial No. 325,977, filed March 26, 1940 being Letters Patent No. 2,311,706, issued February 23, 1943. In the said application Serial No. 273,973, Patent No. 2,258,631, I have disclosed in general a means for securing the release or dissipation of the entrained air from the material, including arrangements permitting the air to pass outwardly from the periphery of the auger through suitable openings in the tube wherein the auger is rotating, but such so-released air must then pass upwardly along the inner wall of the bag or other container, and be released from the top thereof; and this presents certain objectionable features since the upper portion of such bag is generally held tightly to the tube during the operation. That application also discloses arrangements permitting the entrained air close to the hub of the auger to be released upwardly through or adjacent to such hub, passing from the bottom face of the auger to the top face thereof in that manner. That application also discloses means for, if desired, withdrawing such air upwardly through the hollow shaft for delivery outside of the machine.

The operations possible with the machines herein referred to are very rapid, in some cases as high as ten complete filling and packing operations per minute for bags of approximately one hundred pounds contained material, either bran or feed or flour, or the like. This means that the de-aerations must be performed with great rapidity, and with properly directed and controlled paths of flow of the released air, as otherwise the air being released will interfere with the proper flow and operation of the incoming non-de-aerated material. This aspect of the problem is especially grave when operating rapidly and with large bodies or charges of material.

It may be noted that the de-aeration of the material being compacted by the auger is largely a problem of releasing the air from the material beneath the auger, with provision for transfer of such air to the space above the auger, and where the material is in very loose condition and completely un-de-aerated. It is not so important to deliver the air entirely outside of the machine as it is to make provision for effective transfer of the air to a location above the auger, and sufficiently distant from the material being compacted so that the material being compacted by the auger will be in its de-aerated condition, and therefore in condition for proper compacting and compressing.

The main object of the present invention is to make provision for effective transfer of the air from beneath the auger, and especially around the periphery thereof, to a location above the auger; and to accomplish this result in a construction of very simple form and arrangement. In this connection it is a further object to make such provision for such release and transfer from locations around the entire auger periphery, and around the entire periphery of the tube, so that a uniform and complete air release will occur, and such released air be transferred to a location above the auger and within the tube and substantially without contact with the bag or container.

Specifically, it is a further object of the invention to secure this result in a construction in which a double wall tube is provided, with provision for entrance of the releasing air at the lower end, or adjacent to the lower end of such tube; and with provision for delivery of the air from the upper end portion of such double wall tube either to the space above the auger, or to the exterior of the machine as desired.

The entrance of the released air into the annular space within such double walled tube may be effected either at the extreme lower end of such space; or through suitable perforations in the inner wall of such double wall tube; and in the latter case, such perforations may be limited to either the portion of such tube wall at the zone of the auger, or the zone where the air is being released; or may be carried throughout the entire height of such inner wall of the double wall tube.

Furthermore, it is noted that such releasing air will carry with it more or less entrained flour or other fine material; and it is a further object of the invention to so arrange the annular passage of such double wall tube that any such material will either be carried completely to the top of the passage and delivered out at that location into the space above the auger; or will be permitted to fall back into the bag or other container being filled, so that in either case the annular passage will not become clogged up and thus made inoperative.

In my aforesaid Patents Nos. 2,258,631, 2,216,786 and 2,311,706, I have disclosed arrangements including telescoping tubes, the lower tube section telescoping up into the upper or stationary tube, and the lower tube being so connected to the upper or stationary tube that it will rise and fall with the auger and shaft elements. In my aforesaid Letters Patent, No. 2,184,474, I have disclosed an arrangement wherein only a stationary and non-telescoping tube is used, the auger and shaft rising and falling independently thereof. In my present invention and application I disclose arrangements for ensuring the deaeration of the material being compacted and compressed and suitable for use with both the aforesaid schemes, or with schemes in which the auger does not rise, and both embodying the feature of the double-walled tube above explained.

The movement of the released air upwardly through the annular passage of such double-walled tube may be due either to the pressure exerted on said air at the lower or entrance end of the passage, and due to the action of the auger, or to a suction created at the upper end of such passage, and due to creation of a lowered pressure at such location, or to both of these actions. In the case of a lowering of the pressure at the upper or delivery end of the annular passage, such lowering of pressure may be due to a Venturi action; and one object of the present invention is to make provision for ensuring such a Venturi action for this purpose.

Sometimes it will be desired to deliver the released air to the extreme top of the space above the auger, and above the elevation at which the loose material is being supplied into the tube; and it is a further object of the invention to make provision for such operation, if desired.

When a telescoping tube arrangement is used, the lower or vertically moving section will generally telescope into the upper or stationary section, but sometimes a reverse arrangement will be used with the telescoping tube outside of the stationary tube; and it is a further object of the invention to make provision for use of the features of the present invention with either or both of these schemes.

A further object of the invention is to provide a very simple arrangement, one which can be very cheaply built, one which will not materially or substantially interfere with the use of a full sized auger for the bag size in question; and one which will be very light, and therefore not materially interfere with securing very rapid operations, such as heretofore mentioned.

During the packing and filling operation there is a tendency for the material to be forced outwardly by the auger, with consequent compression of said material against the wall of the bag. I have found that unless provision is made to receive this outward thrust, thereby relieving the bag of this force, the bag will sometimes be subjected to a pressure of such magnitude as to burst it. Therefore it is a further object of the present invention to make provision in the form and arrangement of the tube, and the location of the auger with respect thereto, so that such outward pressure will be taken and resisted by the lower portion of the inner tube wall, thereby relieving the bag of such pressure for the reasons indicated.

Other objects and uses of the invention will appear from a detailed description of the same, which consists in the features of construction and combinations of parts hereinafter described and claimed.

In the drawings:

Figure 1 shows a typical form of packer embodying the features of my present invention, said packer being one of the telescoping tube type, wherein the lower tube telescopes upwardly into the upper stationary tube, the said lower or telescoping tube section being double-walled, and with the passage of such double-wall of uniform cross-section throughout its height, the upper and lower ends of the outer wall thereof being inwardly curved to aid the air movements;

Figure 6 shows a view similar to that of Figure 3, but it shows a modified arrangement in which the passage of the double-walled tubular section is tapered, with the cross-section of such taper decreasing as the air moves upwardly therethrough;

Figure 7 shows a cross-section on the line 7—7 of Figure 6, looking in the direction of the arrows;

Figure 8 shows a fragmentary vertical section on the line 8—8 of Figure 7, and it shows the manner in which the inner wall of such tapered passage arrangement may be readily secured to the outer wall of such arrangement;

Figure 9 shows a fragmentary vertical section through the upper portion of a construction in which the outer tube section of the double-walled tubular section has been modified to provide a complete Venturi arrangement, and to facilitate the flow of the incoming loose material to the upper end of the lower tubular section.

Figure 1:
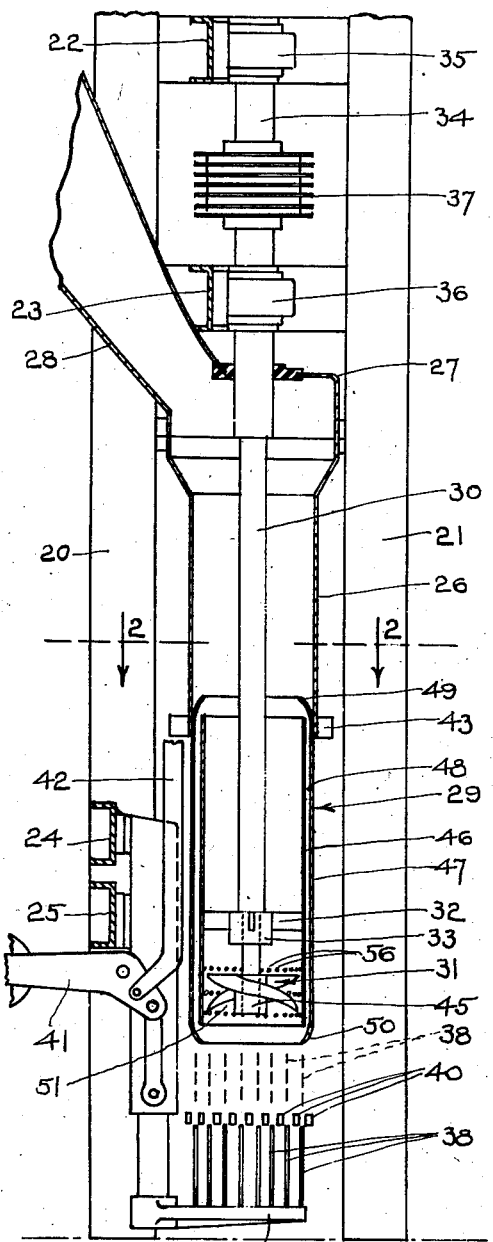
Figure 3:
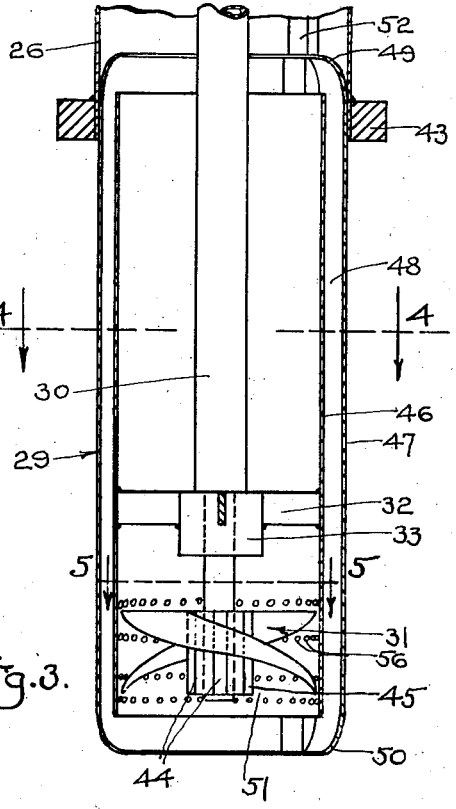
Figure 3 shows a vertical section through the lower or telescoping double-walled section, on double scale as compared to Figure 1.
Figure 4:
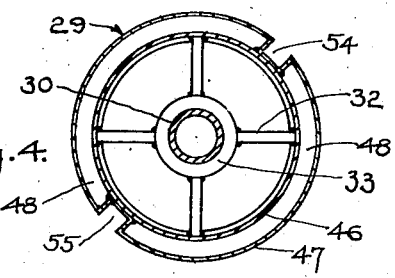
Figure 4 shows a cross-section on the line 4—4 of Figure 3, looking in the direction of the arrows.
Figure 5:
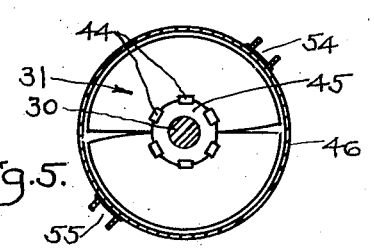
Figure 5 shows a cross-section on the line 5—5 of Figure 3, looking in the direction of the arrows.
Figure 2:
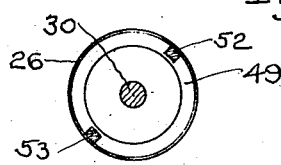
Figure 2 shows a fragmentary cross-section on the line 2—2 of Figure 1, looking in the direction of the arrows.

Figure 10 shows a view similar to those of Figures 3, 6, and 9, but it shows a modified arrangement in which the outer wall of the lower tubular section telescopes onto the outside of the upper stationary tubular section, the inner and outer walls of the double-walled lower tubular section being connected together at their lower ends so as not to interfere with the freedom of the telescoping action above referred to;

Figure 11 shows a cross-section on the line 11—11 of Figure 10, looking in the direction of the arrows;

Figure 12 shows a fragmentary vertical section through the upper portion of a modified arrangement of the lower double-walled tubular section, and wherein the upper ends of the inner and outer walls of the double-walled section are not curved, but are straight;

Figure 13 shows a modified arrangement, being views similar to those of Figures 1, 3, 6, 9, 10 and 12, but in which the features of the present invention are incorporated in an arrangement in which only a stationary tube is used, the shaft and auger rising and falling independently of such tube;

Figure 14 shows a cross-section on the line 14—14 of Figure 13, looking in the direction of the arrows;

Figure 15 shows a cross-section on the line 15—15 of Figure 13, looking in the direction of the arrows;

Figure 16 shows a view similar to the upper portion of Figure 1, but on double scale, and shows a modified form of arrangement, wherein provision is made for delivery of the air from the annular passage into a stationary tube or duct which may lead either to the extreme upper portion of the interior of the packing and filling chamber, or to some location exterior thereto; and Figure 17 shows a cross-section on the line 17—17 of Figure 16, looking in the direction of the arrows.

Referring first to Figures 1 to 5, inclusive, I have therein shown a filling and packing machine including the frame members 20 and 21, which are connected to similar frame members at the near side of the structure (not shown, but cut away in Figure 1), by various cross-members, including the members 22 and 23, and 24 and 25. The upper or stationary tube section is shown at 26. It is provided with a suitable top head 27, the supply chute 28 leading into said supply head, and supplying the charge of loose material from any suitable source, such as a pre-weighing machine. The lower tubular section is shown at 29. In the case of Figures 1 to 5, inclusive, as well as other embodiments herein shown, this lower tubular section telescopes upwardly into the upper tubular section 26. Other arrangements are also shown herein.

The shaft is shown at 30. It extends from a position above the head portion 27, downwardly axially through the tubular sections, and carries at its lower end one or more augers such as 31. In the form shown said shaft may rise and fall with the rising and falling of the tubular section 29, or vice versa, for which purpose there is provided the spider 32 connected to the lower tubular section 29, and to the shaft 30 by means of the bearing 33. Generally, in the case of the present invention such spider will connect to the inner wall of the double-walled lower tubular section, but since both the inner and outer walls thereof are connected together, as will presently appear, the shaft and auger and all portions of the lower tubular section are made to rise and fall together.

The shaft may be driven in any convenient manner; as for example by means of the drive tube 34 which surrounds that portion of the shaft in the upper portion of the head 27, and extending to a position well above such head, said drive tube being suitably splined to the shaft for driving connection therewith, as disclosed in my aforesaid Patent No. 2,311,706. This drive tube may be suitably journalled, as by means of the journals 35 and 36, carried by the frame crossmembers 22 and 23, respectively. This drive tube may be driven in suitable manner, as by means of the pulley 37.

Beneath the lower tubular section when lowered, is the bag support in the form of the plates 38 carried by the bracket 39, and which plates may be moved up and down between the strands 40 of a stranded conveyor. When the bracket 39 is raised to raise the plates they stand between the strands of the conveyor, and the bag may be supported thereby, whereas by lowering the bracket 39 the plates are lowered and the bag is transferred, by a slight downward movement, to the conveyor strands. The up and down movements of the bracket 39 are effected and controlled by means of the rock arms 41, pivoted to the frame of the machine, and connected to the upper portion of the device by means of the link 42. The up and down movements of this link are controlled and effected by suitable connections to the means whereby the up and down movements of the shaft and lower tubular section and auger are effected and controlled; and I do not deem it necessary to illustrate or describe the same in further detail herein, as the same are fully disclosed in my aforesaid patents, especially No. 2,311,706.

Furthermore, some suitable form of bag clutch or catch is preferably provided for holding the upper portion of the bag firmly with respect to the upper or stationary tubular section 26 during the filling and packing operation, and I have herein disclosed the same more or less diagrammatically by the ring 43. The details of the bag clamp do not require further illustration or description herein, as these too are fully shown and described in certain of my aforesaid patents, especially, No. 2,258,631.

Now during the filling and packing operation the bag is supported stationary by the plates 38 which are at that time in the raised or dotted line position of Figure 1, and the upper portion of such bag is then clamped to the lower end portion of the stationary tube 26 by the clamping device 43. As the loose material is dumped through the chute 28 into the head portion 27 said material falls down through the upper tubular section 26 and into the lower tubular section; and due to the very rapid rotation of the shaft and auger which is then occurring (from, say 1000 to 2000 R. P. M.), the auger very rapidly screws itself up through the mass of loose material so descending to the bottom of the bag, and compacts said material into the bag, and as this operation takes place the auger also forces the air out from the body of such material, and packs the material down so that the auger and shaft rapidly rise through the material, forcing out the air, and compacting the material beneath the auger, until finally the operation is complete, the auger standing on the top of the so-compacted body of material in the bag. When this phase of the operation is reached the link 42 is released and the bracket 39 and plates 38 allowed to fall, to thereby deliver the filled and packed bag down onto the strands of the conveyor 40 for movement laterally to another location.

Now it will be evident that during this operation the air entrained in the mass of loose material is very rapidly forced out of such material, principally at the location directly beneath the auger surface, and that such air must be delivered to some location and condition such that it can be flowed away from the auger location; otherwise the air will simply be compressed, and as soon as the force of the auger is released such compressed air will expand and force the material to again loosen up and cease to be compacted. It will also be evident that the space above the auger is at much lower pressure than the space below said auger. I have therefore, as one means for effecting such air release provided the grooves or channels 44 around the hub 45 of the auger, leading from the bottom to the top face of such auger, and permitting release of some of the air from the central portion of the auger face (lower) to the space above the auger. Manifestly, however, these channels may be of limited size and air capacity, and therefore may not be sufficient to effect the complete air release for very rapid operation, and for the masses of material of the sizes which I am able to handle by means of my present improvements. Such grooves or channels are shown in my aforesaid Patent No. 2,258,-631.

According to the present invention I propose to provide the lower tubular section, or at any rate that tubular section in which the auger works, as a double-walled section, thereby establishing an annular channel or passageway between these two walls, such passageway leading from the location of air release adjacent to the auger position, to the space above the auger, or to such other location as may be selected for delivery of such released air. Then I propose to provide arrangements to ensure that the so-released air shall promptly and over a wide area gain access to the lower portion of such annular channel or passageway, so that a very complete and effective release and delivery of the air will be ensured; and I also propose to so arrange the parts that the movement of the air through such passageway shall be enhanced or accelerated by the provision of a naturally created or generated differential of air pressure in said passageway, from its bottom to its top.

In the arrangement of Figures 1 to 5, inclusive, the lower tubular section 29 takes the form of the inner and outer tubular sections, 46 and 47, separated a slight distance from each other to provide the annular passageway 48 which extends substantially the full height of such section 29; and in the arrangement of Figures 1 to 5, the outer wall 47 fits into the upper stationary tubular section 26 with a nice sliding fit, so that proper telescoping action may be secured. Furthermore, in this arrangement, the outer wall 47 is slightly longer than the inner wall 46, overlapping at both top and bottom, and the upper and lower ends of the outer wall 47 are then curved over as shown at 49 and 50. It will be noted that the auger is located slightly above the lower end of the inner wall 46, so that there is provided a "compression ring" portion 51 beneath the auger and against which the material being compressed may be forced, so that lateral compression of said material is thus taken up, and there is no possibility of such pressure being exerted against the lower portion of the bag, which pressure might burst the bag if allowed to be exerted against the bag itself.

In order to prevent the lower tubular section 29 from rotating, while permitting its sliding and telescoping action to occur, I have provided one or more guides between the lower and upper tubular sections 26 and 29. These are the bars or rods 52 and 53 extending vertically and secured to the inner face of the upper tubular section; and the lower tubular section 29 is provided with companion vertically extending grooves or channels to receive said bars and work thereon. These are the grooves 54 and 55 (see Figure 4), and they are readily formed directly in the metal of the outer wall 47. Then the inner wall 46 may be secured to the edges of these grooves by spot welding or otherwise, as readily apparent from Figure 4. Thus, these grooves or channels serve the two functions; and at the same time the passageway 48 between the inner and outer walls 46 and 47 is continuous and of full cross-section throughout its height, being merely divided into two portions through such height.

The portion of the inner wall 46 opposite to the auger location may be provided with a series of relatively small holes 56 to permit direct release of air from the plane at which the compression operation is occurring, and into the lower end of the passage 48; but it will be evident that some air may also enter said passage through the extreme lower end thereof, and around the inwardly curved end 50 of the lower end of the wall 47. If it were desired, such perforations might be provided throughout the entire height of the inner wall 46; but generally that will not be found desirable. The curving or constricting of this lower end as at 50 will also facilitate the setting of the empty bag up and over the telescoping section when commencing an operation.

Now it will be observed that as the operation proceeds, the telescoping section and auger will rise together, and at all times the relationship between the auger and the passageway 48 and the holes 56 will be maintained, so that during the complete filling and packing operation the desired relationship will be maintained. During this action the released air will be delivered through the passageway and out from its upper end at the top of the lower section, where such released air cannot be of any trouble or interference to the packing operation proceeding below. Furthermore, such so-released air will be delivered up in the device above the auger, and where the incoming material is in a very loose and uncompacted condition, and where such released air will be of least objectionability.

Now it will be noted that the upper end of the passageway 48 is curved towards the center of the device; and further, that the presence of the inwardly curved flange 49 serves to somewhat restrict the cross-sectional area of the central portion of the chamber through which the incoming material is being delivered to the auger. Due to this constriction there will be produced a "Venturi action," with consequent lowering of the pressure within the chamber at the location of such constriction; and therefore the pressure at the upper end of the passageway 48 (where it communicates with the interior of the chamber) will be slightly lowered, and the differential of pressure will thus be created in the passageway. This will cause a natural flow of the air upwards through said passageway, improving the flow therein, and thereby improving the aeration action as a whole. The flow of the air through the passageway will thus be due to pressure at its lower end, created by the direct action of the auger, plus suction at its upper end, created by the Venturi action.

It is also noted that the cross-sectional area of the upper end of the annular passageway 48 will depend on the clearance between the inner and outer walls 46 and 47 at the point where the passageway 48 communicates with the interior of the chamber wherein the shaft is located. By reason of this fact said upper discharge end of the passageway 48, leading into the interior of the chamber may be made different from or equal to the cross-section of the vertical portion of the passageway 48. By causing a constriction at that point the velocity of the air will be suddenly increased as the air enters the central chamber, with a consequent lowering of pressure at the upper end of the passageway 48, according to well understood principles.

In some cases it may be found desirable to provide the supplemental reverse curved portion 57 at the upper end of the outer wall 47, as shown in Figure 9, so as to facilitate the movement of the incoming material, and at the same time retaining the benefits of the Venturi action and arrangement just explained.

The arrangement of Figures 6, 7 and 8 is similar to that of Figures 1 to 5, inclusive; but in the present case the inner wall 58 is slightly tapered from top to bottom so that the cross-sectional area of the passage 59 correspondingly increases from top to bottom; and thus the rate of air flow through said passage undergoes a reduction from bottom to top. Furthermore, with this arrangement, any fine material which may find its way into this passage will be more readily released and fall back to the bottom end of the passage; and the tendency of any such material to "hang up" in the passage will be lessened.

Due to the tapering of the inner wall 58 of the arrangement of Figures 6, 7 and 8, I have made provision for securing the inner and outer walls of the lower tubular section together by use of the vertically straight channels or grooves of the outer wall. This includes the spacer blocks 60 at the lower ends of the parts; the outer and inner walls being spot-welded directly together at their upper ends; and the spacer blocks 60 being welded to both said walls at the lower ends of said walls.

In the arrangement of Figures 10 and 11, I have shown the features of my present invention as applied to a scheme in which the outer wall 61 of the lower tubular section slides over the outside of the stationary upper section 26, the inner wall 62 of such lower section riding to the inside of the upper section 26. To secure this result I have provided the brackets 63 connecting the lower ends only of the two walls 61 and 62, so that a substantially complete upward movement of the lower section may be performed without interference between the parts.

In the arrangement of Figure 12 I have shown the upper ends of both the inner and outer walls 64 and 65 as being straight, and without the curving of the outer wall, as in the arrangements of Figures 1 to 9, inclusive.

In the arrangement of Figures 13, 14 and 15, I have shown the features of my present invention as embodied within a structure in which there is no telescoping of the parts. In this case the tube 66 is stationary, and either straight or preferably slightly flared from top to bottom; and the shaft 67 may or may not move vertically while rotating, the auger 68 being carried by its lower end. The material is introduced through the chute 69 into the upper portion of the tube 66 or the housing 70. The bag is supported by the platform 71 beneath the lower end of the tube 66, and the upper end of this bag is conveniently clamped around the tube, the bag being shown at 72 in dotted lines. This general type of machine is shown in Letters Patent of the United States to me, No. 2,184,474, already referred to.

In order to embody the features of the present invention to the machine of Figures 13, 14 and 15 I have shown the outer wall 73 as placed around the flaring wall 66, said outer wall having its upper end secured to the lower portion of the housing 70, and establishing the annular passage 74 between the two walls. The lower end of the outer wall may be contracted as shown to facilitate the setting of the empty bag into place preparatory to a filling and packing operation. It will be noted that the housing 70 is somewhat flared as shown at 75, and that this flare takes place directly above the upper extreme of rise of the auger and shaft. Consequently there is produced a pronounced Venturi throat at the location 76, so that a substantial lowering of pressure will occur at that location during the filling operation. I then provide a series of openings 77 in this flared opening so that the air flowing up through the passage 74 may be delivered through these openings and into such location of reduced pressure. With any such arrangement the flow of air up through the double-walled section is due to both pressure at the location of the auger, and suction at the upper end of the passageway. It should be noted that the inner wall is provided with a series of relatively small openings 78 through which the released air is allowed to flow from the auger location to the passage 74; and since the tube wall 66 is stationary it is sometimes found desirable to provide these openings throughout the height of the device, so as to permit of release of air from the auger position at all times during the rise of the auger in operation when a rising auger is used. In other cases it may be found unnecessary to provide these openings except in a zone near the lower edge of the wall 66.

In the arrangement of Figures 16 and 17 I have shown a scheme somewhat similar to that of Figures 1 to 5, inclusive; but in the present case I have shown the upper end of the passage 79 between the inner and outer walls 80 and 81 as closed or sealed as shown at 82, such closing or sealing preferably being so formed as to interfere with the down flow of the incoming material as little as possible. Then I have provided one or more stationary tubes 83, relatively thin and broad, which have their lower ends extended through the sealing or closing portion 82, and said tubes reaching into the passage 79. The upper end or ends of such tubes may be curved over as shown in Figure 16, so as to reach to such portion of the interior of the head portion 84 as may be desired, and to a location where the pressure conditions may be most advantageous for creation of suction in such tube or tubes; or in some cases such tube or tubes may be carried out of the head portion 84 to the exterior of the machine or to any suitable suction or exhausting device.

While I have herein shown and described only certain embodiments of the features of my present invention, still I do not intend to limit myself thereto, except as I may do so in the claims to follow.

I claim:

1. In a device of the class described, the combination of a stationary filling tube, establishing a packing chamber, a vertically movable filling and packing tube telescopically mounted in said stationary filling tube, a vertical shaft extending axially through both tubes, an auger on the lower portion of said shaft, bearing means to connect the shaft and the lower telescoping tube together in such manner that rotary motion of the shaft with respect to the movable tube, and vertical movements of the shaft, auger and movable tube together are effected, said vertically movable filling and packing tube comprising inner and outer tubular walls with a vertically extending passage between them, the upper end portion of the outer tubular wall being contracted in size to thereby establish a reduced passage for movement of material from the stationary filling tube into the confines of the inner tubular wall of the vertically movable filling and packing tube, with consequent reduction of air pressure at the location of said reduced passage, the upper portion of the passage between the inner and outer tubular walls communicating with the space within the movable filling and packing tube at the location of said contracted passage portion, whereby movement of material downwardly into the movable filling and packing tube results in reduction of air pressure adjacent to the upper end of said passage, with consequent improvement of air flow upwardly through said passage, substantially as described.

2. In a device of the class described, the combination of a stationary filling tube, establishing a packing chamber, a vertically movable filling and packing tube telescopically mounted in said stationary filling tube, a vertical shaft extending axially through both tubes, an auger on the lower portion of said shaft, bearing means to connect the shaft and the vertically movable telescoping tube together in such manner that rotary motion of the shaft within the movable tube, and vertical movements of the shaft, auger and movable tube together are effected, said vertically movable filling and packing tube having a vertically extending passage, said passage communicating with the space within said movable tube adjacent to the auger location, and said passage also communicating with the space within said movable tube adjacent to the upper end of said movable tube, the upper end portion of said vertically movable tube being contracted in size to thereby produce a Venturi action adjacent to the location of communication of the upper end of the passage with the space within said movable tube, substantially as described.

3. In a device of the class described, the combination of a stationary filling tube, and a vertically movable filling and packing tube telescopically mounted therewith, a shaft extending axially through said tubes, an auger on said shaft, bearing means to connect the lower end portion of the shaft with the vertically movable tube, in such manner that rotary motion of the shaft and auger within said movable tube, and vertical movements of said parts together are effected, there being a vertically extending passage in the vertically movable tube, said passage having inlet communication with the interior of said movable tube adjacent to the location of the auger, the upper end portion of said vertically movable tube being contracted in cross-sectional area to thereby produce a Venturi effect at that location, and the upper end portion of the passage communicating with the interior of the vertically movable tube at the location of such contraction, whereby the movement of air upwardly through the passage is enhanced by said Venturi effect, substantially as described.

ALFRED SOWDEN.